June 30, 1942. F. C. ATWOOD 2,287,928
PROCESS FOR TREATING PROTEINACEOUS MATERIAL
Filed Nov. 27, 1939
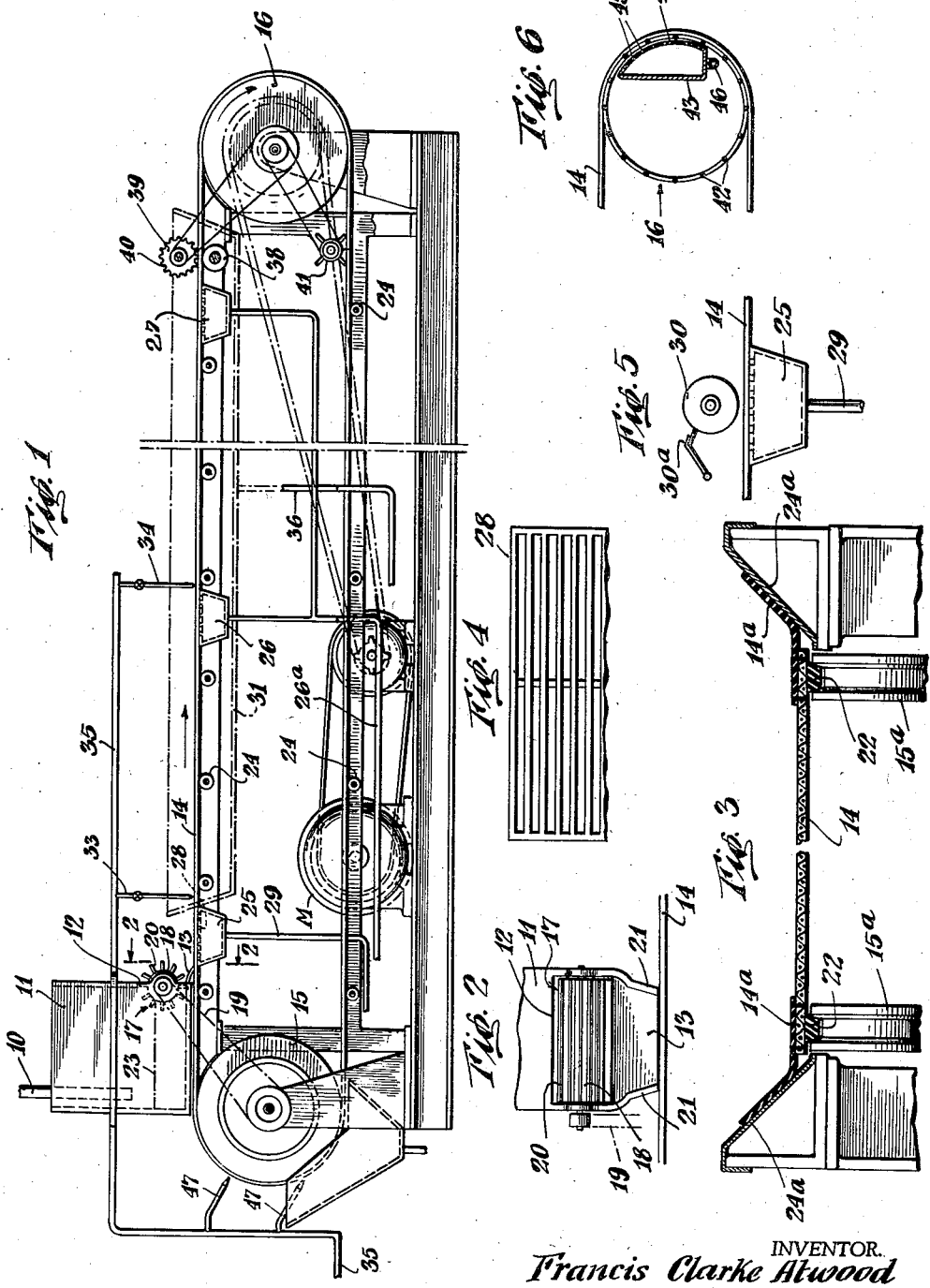
INVENTOR.
Francis Clarke Atwood
BY Hoguet, Neary & Campbell
his ATTORNEYS Patented June 30, 1942

2,287,928

UNITED STATES PATENT OFFICE 2,287,928

PROCESS FOR TREATING PROTEINACEOUS MATERIAL

Francis Clarke Atwood, Newton, Mass., assignor to Atlantic Research Associates, Inc., Newtonville, Mass., a corporation of Delaware Application November 27, 1939, Serial No. 306,257

1 Claim. (Cl. 260—120)

This invention relates to the treatment of proteinaceous materials, and has particular reference to a novel method and apparatus for separating casein from whey, and washing the casein to remove ash forming constituents therefrom.

Casein is a unique and variable product in that the method of manufacturing it from milk greatly affects its physical and chemical properties, for example, its hardness, ash content, ease of solution, viscosity of solution, clearness of solution, etc. Nevertheless, casein is used in large amounts in diversified industries, such as in the manufacture of synthetic fibers, films, casings, plastics, paints, sizes and adhesives. In the manufacture of many products from casein, it is essential that the casein used as the raw material be uniform, since a change in the raw material would reflect a change in the finished product or require extensive changes in the process utilizing the casein. There is, therefore, a great demand for a uniform, high grade casein, but since the method of manufacturing casein greatly affects its properties, it has not been possible heretofore to produce a uniform high grade product except on a large scale under careful control.

Such a large scale manufacturing operation requires extensive and expensive equipment. It also requires expert and careful technical control in order to achieve the desired uniformity. As a result, it is not economical for a small producer to operate such expensive equipment with the necessary technical control; if he is to utilize his skim milk as casein it is necessary for him to transport the milk to a large producer who has the necessary extensive equipment. If a small producer attempts to manufacture the casein himself, the product must generally be reprocessed to conform to standard specifications, thereby rendering the procedure uneconomical.

There is, therefore, a great demand for a method and apparatus for manufacturing a uniform, high grade casein adaptable to the requirements of the small producer. It is to such a method and apparatus, more particularly, that my invention relates.

It is an object of my invention to provide a method and apparatus for producing a uniform, high grade casein, which is mechanically simple and foolproof and operable without extensive supervision and technical control, which is inexpensive to construct and operate, and which is adaptable for installation in plants of small capacities.

As a result of my invention, farmers, milk producers and creameries in isolated areas are enabled to convert skim milk into a uniform, high grade casein for which there is a great demand, and thereby to avoid the transportation of the skim milk to a large central plant which in many instances would make the manufacture of casein from skim milk uneconomical. The users of such high grade casein are also assured of a product in ample quantity and quality for their manufacturing operations.

Many users of casein demand a low ash and/or low acid casein, particularly when it is to be used in the manufacture of fibers or films, because the low ash content gives an improved strength and transparency to the products. The methods heretofore available for producing a low ash casein, i. e. with a "true ash" content of not over 2½%, have been relatively inefficient so that casein having this desirable low ash and low acid content has commanded a premium on the market.

It is an object of my invention, therefore, to produce a casein having a low ash and/or low acid content, in addition to the high grade uniformity and the facility of manufacture mentioned heretofore.

The majority of casein made today is very crudely precipitated, pressed, and later washed at a centralizing plant. It is of a very inferior grade.

The methods and machines for large scale production of a good grade of casein generally employ what is known as instantaneous precipitation, the settling of the curd in the whey, and a screw type of conveyor by means of which the curds are moved through the various washing solutions. With these currently used procedures for manufacturing casein, it is an accepted practice in precipitating the casein from the milk to employ a relatively high temperature and to precipitate the casein instantaneously by adding an amount of acid in excess of that necessary to change the pH value of the skim milk to the isoelectric point of casein (at which point the least amount of casein is in solution and lost with the whey). The higher temperature and the instantaneous precipitation are essential in such methods in order to obtain a precipitate predominant in large casein curds, thereby permitting quick settling of the curds in the whey and the washing of the curds with the screw conveyor apparatus.

The above described presently used method has a number of disadvantages. The temperature and acidity used to form a predominance of the large curds are not conducive to a complete precipitation of the casein from the skim milk. There is a loss due to incomplete settling. The mechanical screw conveying system also causes any small particles of casein to be lost in the wash water as well as a partial breaking up of the large curds with a consequent further loss of small particles.

When the casein is formed and maintained in the large lumps, as is desirable in screw conveyor machines, the casein cannot be quickly and readily washed, because the lumps occlude salts and impurities that are intended to be removed by washing. This results in a high ash content in the casein which, as indicated heretofore, is undesirable in some instances. The dilemma of the prior art is clear: if the casein is in small lumps it is difficult to settle in the whey and to move with the screw conveyors and the loss is high; when the casein is in large lumps it is difficult to wash and the resulting ash content is high.

In accordance with my invention, it is an object to precipitate the casein from the milk with the greatest efficiency, since the resultant form of the curds is not an important factor in my process. More particularly, it is an object of my invention to accomplish the precipitation gradually whereby the exact iso-electric point of the casein is reached resulting in maximum insolubility of the casein.

It is also an object of my invention to handle and wash the casein without loss when in the form of small particles or curds. More particularly it is an object to separate the casein by filtration both from the whey and the wash water, thereby avoiding losses irrespective of the smallness of the curd particles.

In general, therefore, it is a further object of my invention to provide an efficient method and apparatus for the manufacture of casein to obtain substantially greater percentage yields of the finished product than has been heretofore obtainable.

Further objects of the invention will be apparent to one skilled in the art from the following description and drawing, in which:

Figure 1 is a view in elevation of the invention with portions of the structure being shown in sectional elevation;

Figure 2 is a view taken along the lines 2—2 of Figure 1 in the direction of the arrows;

Figure 3 is a view in section of a modified form of endless belt and supporting means therefor, which can be employed in my invention;

Figure 4 is a plan view of a preferred form of supporting plate for use with the suction boxes of the invention;

Figure 5 is a sectional elevation of a modified form of the invention; and

Figure 6 is a sectional elevation of a modified form of roller supporting the conveyor belt.

My invention is applicable to the manufacture and treatment of casein precipitated from milk by natural fermentation, by the addition of a mineral acid to the milk, or by precipitation with an enzyme such as rennet. It is also applicable to the rennet-precipitated acid-treated casein as described in my application Serial No. 260,334, filed March 7, 1939. In addition it is applicable to the treatment of a curd obtained from the proteinaceous content of soya beans and often referred to in the art as soya bean casein.

For illustrative purposes I will describe my invention with reference to the precipitation of the casein by the addition of a mineral acid. In accordance with such an illustrative embodiment of my invention, a suitable quantity of skim milk is placed in a vat, and an acid, such as hydrochloric acid, is slowly added in a quantity sufficient to precipitate the casein and bring the mixture of whey and casein to the iso-electric point of the casein. The curd is then broken up into particles of very small size. The mixture of whey and small curd particles in a more or less homogeneous form is then pumped onto a belt made of filter cloth of such fineness as to allow the liquid to drain therethrough but to hold even the smallest particles of the precipitated curd. This mixture is spread out as an even layer on the upper side of the cloth which is then subjected to suction on its lower side to remove the whey through the filter cloth. The casein remaining on the cloth is then subjected to water, preferably by means of a spray such as will break up the mass of the casein particles, or by suitable mechanical means for accomplishing this. The curd is permitted to stand in the water for a period of time sufficient to permit a leaching of the soluble salts and other soluble materials from the curd particles in addition to a solution of the whey on the surface of the particles, but insufficient to permit any re-solution of the casein. The filter belt containing the whey and water mixture is then subjected to suction to remove the wash water and dissolved material. The washing, soaking and suction may be repeated as many times as desired but generally two washings are sufficient. The entire procedure is carried out preferably as a continuous operation and the casein-whey mixture is pumped onto a continuously moving filter belt which is moved past designated stations at which the various suction, washing, and other operations occur; the speed of the belt is adjusted so as to permit the proper action of the leaching and suction operations.

After the last wash water is removed by suction, the casein may be squeezed lightly to remove further moisture after which the casein is removed from the belt.

The fact that the casein is removed from the whey by means of a filter cloth makes it possible to break the casein curd into very fine particles while it is in the whey mixture, thereby allowing the entire body of casein and whey to be brought to the desired iso-electric point with a minimum of acid. Because the whey is brought to the same iso-electric point as the casein there is no tendency for resolution of casein in an acid whey. Also, when the casein is at its iso-electric point, the casein is normally at the point of minimum wet volume and will express the maximum amount of mineral and salt from the curd. The formation of the casein curd as fine grained particles also facilitates the washing operation permitting the removal of the maximum amount of the remaining salts that may be occluded within the particles.

The process in accordance with my invention is not to be confused with a so-called rotary vacuum filter, because such apparatus does not permit a soaking or leaching of the casein with water prior to removal by suction, which action is essential for the proper removal of the salts occluded within the casein curd.

When my invention is applied to the rennet-precipitated acid-treated casein, such as described in my application Serial No. 260,334 heretofore mentioned, the casein is precipitated with rennet following which the mixture of casein and whey is treated or washed with acid to bring the mixture to about the iso-electric point of casein.

This treatment is such as to reduce the curd to a small particle size. The acidic mixture of casein and whey may then be pumped onto the filter belt in the manner described heretofore.

In the manufacture of casein precipitated by natural fermentation or by enzymatic fermentations, the casein-whey mixture is agitated or otherwise treated to reduce particles to very fine size and then pumped onto the travelling filter belt where it is treated as described heretofore.

Referring more particularly to an illustrative embodiment of my invention, a suitable quantity of skim milk is placed in a mixing vat, and a mineral acid, such as hydrochloric acid slowly added to the skim milk in a quantity sufficient to coagulate the proteinaceous content of the milk, the acid content of the mixture being gradually adjusted to obtain a pH value in the mixture approximating the iso-electric point of casein.

After or during the adjustment of the pH value, the mixture is violently agitated with a suitable agitator, reducing the curds to an extremely fine particle size. Inasmuch as the mixing vat and agitator may be of conventional types, they are not illustrated in the drawing.

The mixture of curds and whey is discharged from the mixing vat through an outlet pipe 10 into a tank or reservoir 11, as shown in Figure 1 of the drawing. The lower portion of the tank 11 has an aperture 12 arranged to discharge the casein-whey mixture over a rubber lip or chute 13 onto an endless filter cloth belt 14 carried by rollers 15 and 16, the said discharge being controlled by a rotating gate member 17 positioned in the said aperture. The said gate member 17 comprises a drum 18 rotated by a driving belt 19 powered by the roller 15; the drum 18 carries a number of radially extending paddles or gates 20 adapted to agitate the mixture in the tank 11, and convey portions of the casein and whey over chute 13 onto the belt 14.

To obtain an even distribution of the curds upon the belt 14, the curd-whey mixture in the tank 11 should be maintained at the level about that indicated by the dotted line 23, thus insuring an adequate supply of the mixture available for distribution over the belt 14 by the action of the paddles 20 of the gate 17.

As shown in Figure 2, baffles 21 extending from the tank 11, enclose the chute 13 and direct the discharge from tank 11 to the central portion of the belt 14, thereby preventing splashing of the whey and loss of portions of the mixture over the edges of the belt 14. The rate of travel of the belt 14 and the gate 17 is so coordinated as to place a uniform relatively thin layer of the casein-whey mixture on the belt such as can be supported on the upper belt surface. As an optional construction, as shown in Figure 3, the belt 14 also may be mounted on V-shaped belts 22 which are driven by pulleys 15a which are used instead of the rollers 15 and 16. In this construction, the load and driving force is taken by the belts 22 which are of a stronger material than the belt 14. If desired, rubber side strips 14a may also be secured to the belts 22. These side strips cooperate with side guides having an inclined surface 24a whereby the casein and fluids are retained on the belt 14.

The belt 14 is of the endless belt type composed of a filter cloth sufficiently porous to allow passage of liquid therethrough when subjected to suction forces, but of sufficiently tight weave to withhold any particles of solid matter suspended in the liquid and to resist passage of liquid when not subjected to suction forces. As shown in Figure 1, the belt 14 is supported upon rollers 15 and 16, the latter being rotated by a suitable source of power such as the motor M. Small supporting rollers 24 maintain the belt on a level plane, preventing undesirable stretching or sagging.

A number of suction boxes 25, 26 and 27, maintained under a vacuum by conventional means, are positioned at spaced intervals adjacent the under surface of the belt 14, the said boxes being covered at their top by perforated supporting plates 28, a preferred embodiment of which is shown in Figure 4. With the direction of the belt such as indicated by the arrow in Figure 1, the box 25 is positioned with its leading edge immediately under the point at which the lip or chute 13 engages the belt 14. As the curd-whey mixture is discharged upon the porous belt 14, the vacuum maintained in the box 25 draws the whey through the belt, immediately effecting a maximum separation of whey from the curd. The whey is carried in a pure state through the conduit 29 leading from the box 25 to a suitable whey tank, for subsequent refinement.

As an optional construction, a roller 30, having a scraper 30a, may be positioned above the surface of the belt 14 over the suction box 25, as shown in Figure 5, the said roller being employed to procure an even distribution of the curds on belt 14, and to hold the curds firmly against the belt so as to achieve a maximum filtering effect.

After the removal of the whey, the belt 14 advances the casein under a spray of water from the jets 33, supplied by a water pipe 35, which sprays water on the casein layer on the belt 14. To insure intimate admixture of the water and casein, the casein layer is preferably broken up during the spraying by the action of the spray or by raking or other suitable treatment. This insures the maximum contact of the curd surfaces with the wash water hastening the removal of the surface film of salt-containing impurities which adhere to the casein particles. The belt then moves the casein to the suction box 26 where the wash water is removed and discharged through a pipe 26a. The jets 33 are positioned so that the water is applied immediately after the casein leaves the vacuum box 25. This permits the wash water to remain in contact with the casein for an interval of time before the water is filtered through the belt 14 by action of the suction box 26. While the fine particle size of the casein permits of a more speedy and effective washing than is possible with large size curds, nevertheless the interval of time between application of the wash water to the casein and removal of the water by the filters is desirable in order to achieve an osmotic penetration of the curds by the wash water to effect removal of a maximum practical amount of the salt impurities occluded by the curds.

In practice, it has been found desirable to position the water jets 33 and vacuum box 26 within the limits of from 4 to 8 feet therebetween, with the belt 14 moving at a rate of 15 to 20 feet per minute. This distance may, of course, be varied with proportionate adjustment of the speed of travel of the belt 14.

The washing of the casein, preferably, is then repeated, the belt 14 passing under the second water jet 34 and subsequently over a suction box 27, whereby the casein is washed, permitted to soak in the water, and then freed from the water by suction.

The casein may be washed in the manner described only once, or as many times as is deemed desirable. The apparatus may be constructed with one or more washing stations. It has been found, however, that two of such washings are satisfactory under ordinary circumstances, for effecting complete removal of surface salts and a major portion of occluded salts from the finely divided curd, besides eliminating all traces of acidity from the casein.

During the interval of movement of belt 14 between jet 33 and the roller 16, the trough 31 serves to catch any seepage of wash water through belt 14, the water being discharged through waste conduit 36.

After passing over suction box 27, the belt 14 carries the casein layer between squeeze rollers 38 and 39 that are adapted to remove a large portion of the remaining moisture from the curd. The rollers are located adjacent the suction box 27 so that the water expressed from the curd may be drawn into the box. If desired, the upper roller may have longitudinal grooves 40 on its surface as this assists in preventing the casein from stacking up in front of the roller. The belt then passes over roller 16, discharging the casein into a bin or conventional conveying mechanism carrying the casein to a drying chamber or similar device.

It is desirable to remove any remaining casein adhering to the belt 14. One embodiment of a means for accomplishing this is shown in Figure 1. As the belt travels free of roller 16, it is subjected to a beating or vibrating action by an agitator 41, which removes any remaining traces of the casein from the belt.

In another embodiment, shown in Figure 6 of the drawing, the roller 16 comprises a frame 42 carrying the belt 14 on its outer periphery. A chamber 43 is rigidly positioned within the said frame, the face 44 of the chamber being perforated at 45 and curved to fit closely adjacent the inner periphery of the frame 42 of the roller 16. The chamber 43 is adapted to be supplied with air under pressure through conduit 46, the air discharging through the perforations 45 against the under surface of the porous belt 14, thus forcing air through the belt from the rear and removing the casein from the belt 14 as the latter travels on the roller 16.

As the belt 14 engages the roller 15, jets 47 supplied with water by conduit 35, discharge water at a high velocity onto the belt 14, thoroughly washing the belt before the process is repeated. This prevents the belt from becoming clogged after continued use.

When it is essential to be economical in the use of water, it is feasible to reutilize the water from the jets 47. After this water has been used in cleaning the belt, it is collected, with its suspended casein particles, and used to supply wash water to the jets 33 and 34. At the same time, the suspended casein is removed. In addition, in economizing on water, the wash water from different washing stages can be collected separately, and the water from the last stage, which contains very little impurities, can be used at an earlier part of the process where a substantial amount of impurities are removed. In such an instance, absolutely fresh water would be needed at one or two points in the process and the rest of the water might be supplied by recirculating the water from a later stage.

In certain instances, it may be desirable to treat the curd with additional agents such as moth-proofing salts, fungicides or other types of preservatives. In this event such agents may be applied conveniently as a spray onto the wet curd near the end of the belt.

The continuous casein washing method described heretofore is an ideal arrangement for handling casein from continuous casein precipitation processes such as now known, provided that a curd granulating device is employed so that the casein is in a finely divided condition as it is passed onto the porous belt for separation from the whey and for washing. Ordinary cheese granulators or curd breakers do not reduce the casein sufficiently. I have found that a very desirable curd breaker may be made by coating cylinders with a card clothing such as is used in woolen carding machines. In particular, a very sturdy, stiff fingered card cloth shreds and granulates the casein curds in an ideal manner. The curd particles are also reduced to such a size as will enable them to be dried in a continuous high speed and instantaneous drying operation as described in my copending application Serial No. 401,854, filed July 10, 1941.

While the invention has been described with reference to an illustrative method and apparatus, it is obvious that many variations and modifications are possible, and I intend the same to be included in my invention as defined in the appended claim.

I claim:

The process for treating casein curds to obtain a relatively low ash casein product which comprises the steps of advancing casein curds through a plurality of zones, subjecting the curds to suction forces at the first zone to filter and remove whey from the curds, spraying an aqueous washing liquid over the advancing curds at a second zone and maintaining the washing liquid and curds in contact with each other while the curds are advancing and until the curds reach a third zone and for a sufficient time to effect a solution in the washing liquid of impurities occluded in the curds, and filtering by suction forces the advancing layer of curds and washing liquid at the third zone to remove the washing liquid and dissolved impurities.

FRANCIS CLARKE ATWOOD.